(12) United States Patent
Hadley et al.

(10) Patent No.: US 9,403,559 B1
(45) Date of Patent: Aug. 2, 2016

(54) HELICOPTER TRANSPORT APPARATUS

(76) Inventors: William Wade Hadley, Clarksville, TN (US); Laurie F. Hadley, Clarksville, TN (US); Charles Lee Phy, McEwen, TN (US)

( * ) Notice: Subject to any disclaimer, the term of this patent is extended or adjusted under 35 U.S.C. 154(b) by 1849 days.

(21) Appl. No.: 11/545,322

(22) Filed: Oct. 10, 2006

Related U.S. Application Data

(60) Provisional application No. 60/725,886, filed on Oct. 11, 2005, provisional application No. 60/618,338, filed on Oct. 13, 2004.

(51) Int. Cl.
*B60P 1/00* (2006.01)
*B62D 33/02* (2006.01)

(52) U.S. Cl.
CPC ..................................... *B62D 33/02* (2013.01)

(58) Field of Classification Search
USPC .......................... 280/656, 6.151, 43.13, 43.17
See application file for complete search history.

(56) References Cited

U.S. PATENT DOCUMENTS

| | | | | |
|---|---|---|---|---|
| 3,993,324 A | * | 11/1976 | Carrick | 280/414.1 |
| 4,363,590 A | * | 12/1982 | Crate | 414/518 |
| 4,374,592 A | * | 2/1983 | Geary et al. | 280/476.1 |
| 5,700,026 A | * | 12/1997 | Zalewski et al. | 280/6.152 |
| 6,273,435 B1 | * | 8/2001 | Stringer | 280/6.151 |

* cited by examiner

*Primary Examiner* — Katy M Ebner
(74) *Attorney, Agent, or Firm* — Gerald R. Black, Esq.

(57) ABSTRACT

A helicopter transport apparatus comprising a multi-wheel trailer comprising a platform, a torsion bar axle and suspension system, a hydraulic power unit, hydraulic lift cylinders, a winch, and a means of adjusting the height of the trailer over the range of elevations required for loading, unloading, and transporting a helicopter.

16 Claims, 7 Drawing Sheets

HELICOPTER TRANSPORT APPARATUS

CROSS REFERENCES TO RELATED APPLICATIONS

Provisional Application for Patent No. 60/618,338, filed Oct. 13, 2004, with the same title, "Helicopter Transport Apparatus" which is hereby incorporated by reference.

Provisional Application for Patent No. 60/725,886, filed Oct. 11, 2005, with the same title, "Helicopter Transport Apparatus" which is hereby incorporated by reference. Applicants claim priority pursuant to 35 U.S.C. Par. 119(e) (1).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to a transport apparatus enabling loading, transport, and unloading an aircraft such as, but not restricted to, a rotary wing aircraft, commonly known as a helicopter.

2. Background Information

Helicopter transport trailers for moving helicopters relatively short distances at relatively low speeds, i.e. walking speeds, on an airfield are known to the trade. As the purchased costs of helicopters has increased over the years, better helicopter transport trailers are needed. Also, existing helicopter transport trailers are not suited for highway transport. The current method of transporting a multimillion dollar military helicopter is to use a flatbed truck. The helicopter is loaded by a crane.

To recover a helicopter from the field currently requires a crane and specialized sting and rigging. The operation using a sling requires several people to guide the helicopter onto a flatbed trailer to avoid damage and to release the sling.

As will be seen in the subsequent description of the preferred embodiments of the present invention, the present invention overcomes shortcomings of prior art.

SUMMARY OF THE INVENTION

The present invention in the preferred embodiment is an aircraft transport apparatus such as is usable for, but not restricted to, loading, transporting, and unloading a helicopter comprising a multi-wheel trailer comprising a platform, a torsion bar suspension assembly, a hydraulic power unit, hydraulic rams, a winch, and a means of adjusting the height or the trailer over the range of elevations required for loading, unloading, and transporting a helicopter.

DESCRIPTION OF THE PREFERRED EMBODIMENTS

Figure 1:
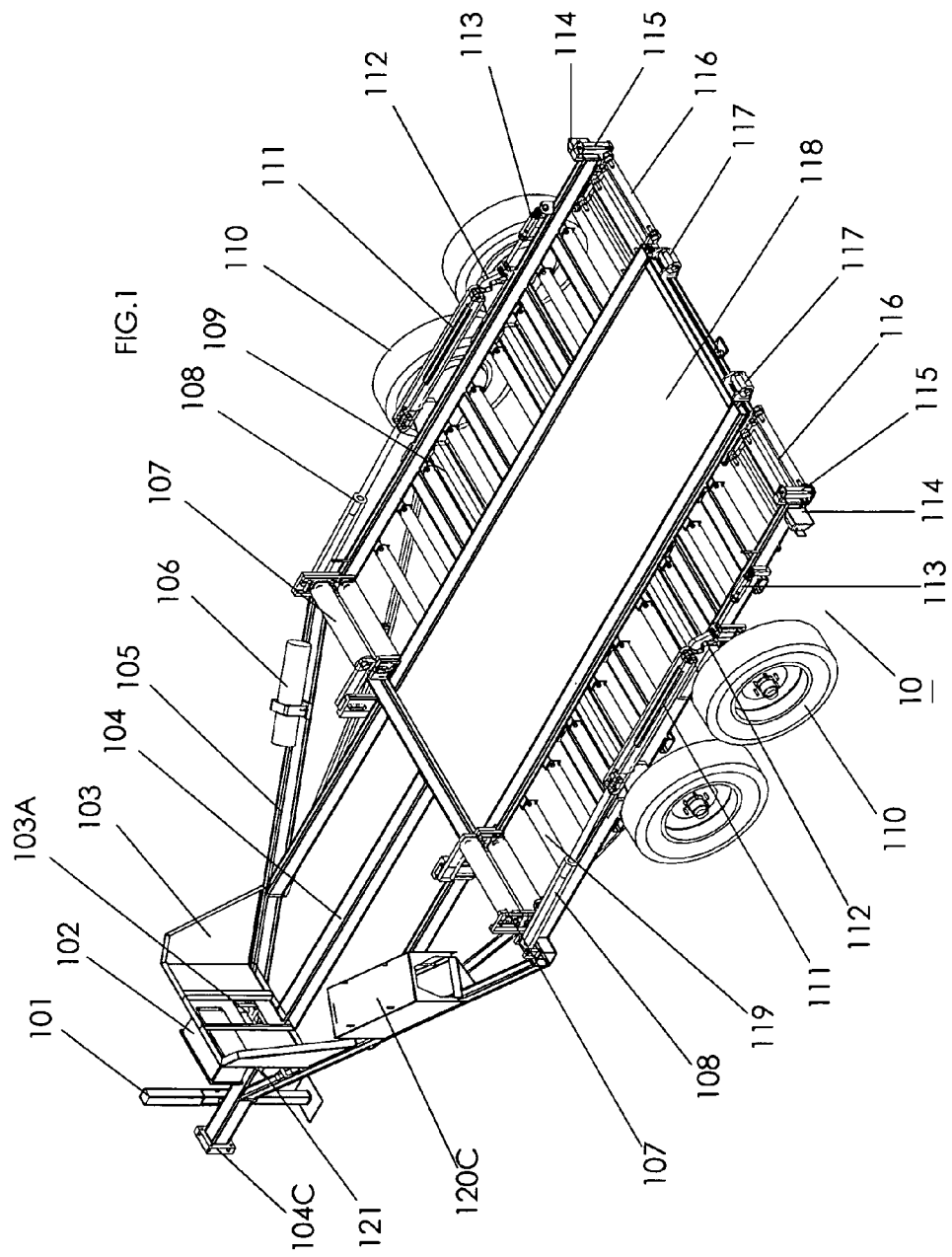
FIG. 1 illustrates the preferred embodiment of the present invention, a helicopter transport apparatus.
Figure 5:
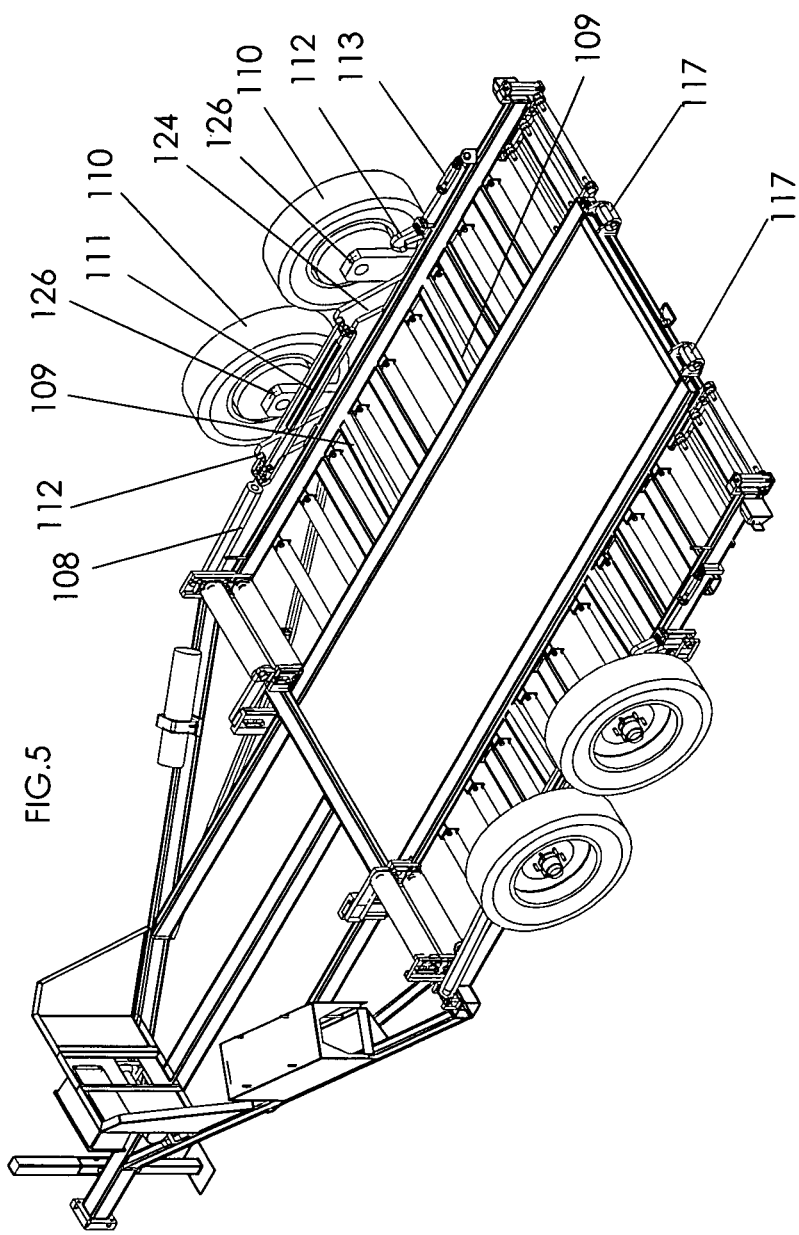
FIG. 5 illustrated the helicopter transport apparatus in the lowered elevation for loading a helicopter.

Referring to FIGS. 1 and 5, the preferred embodiment of the present invention, a helicopter transport apparatus 10 comprises a trailer jack 101, a hydraulic control 102, a front guard 103, a winch clearance 103A, a tongue 104, a frame 105, a hydraulic pump 106, bumpers 107, lift cylinders 108, wheels 110, pivot links 111, latches 112, lock cylinders 113, brake lights 114, vertical rollers 115, rocker roller assemblies 116, ground rollers 117, deck plate 118, helicopter skid rollers 119, battery containment assembly 120C, and winch 121.

The winch 121 serves to load a helicopter onto the helicopter skid rollers 119.

The vertical rollers 115 serve for location of the skids of a helicopter to be loaded onto the skid rollers 119.

The rocker roller assemblies 116 each pivot about a central axis, perpendicular to a helicopter skid in the loading of a helicopter.

Figure 2:
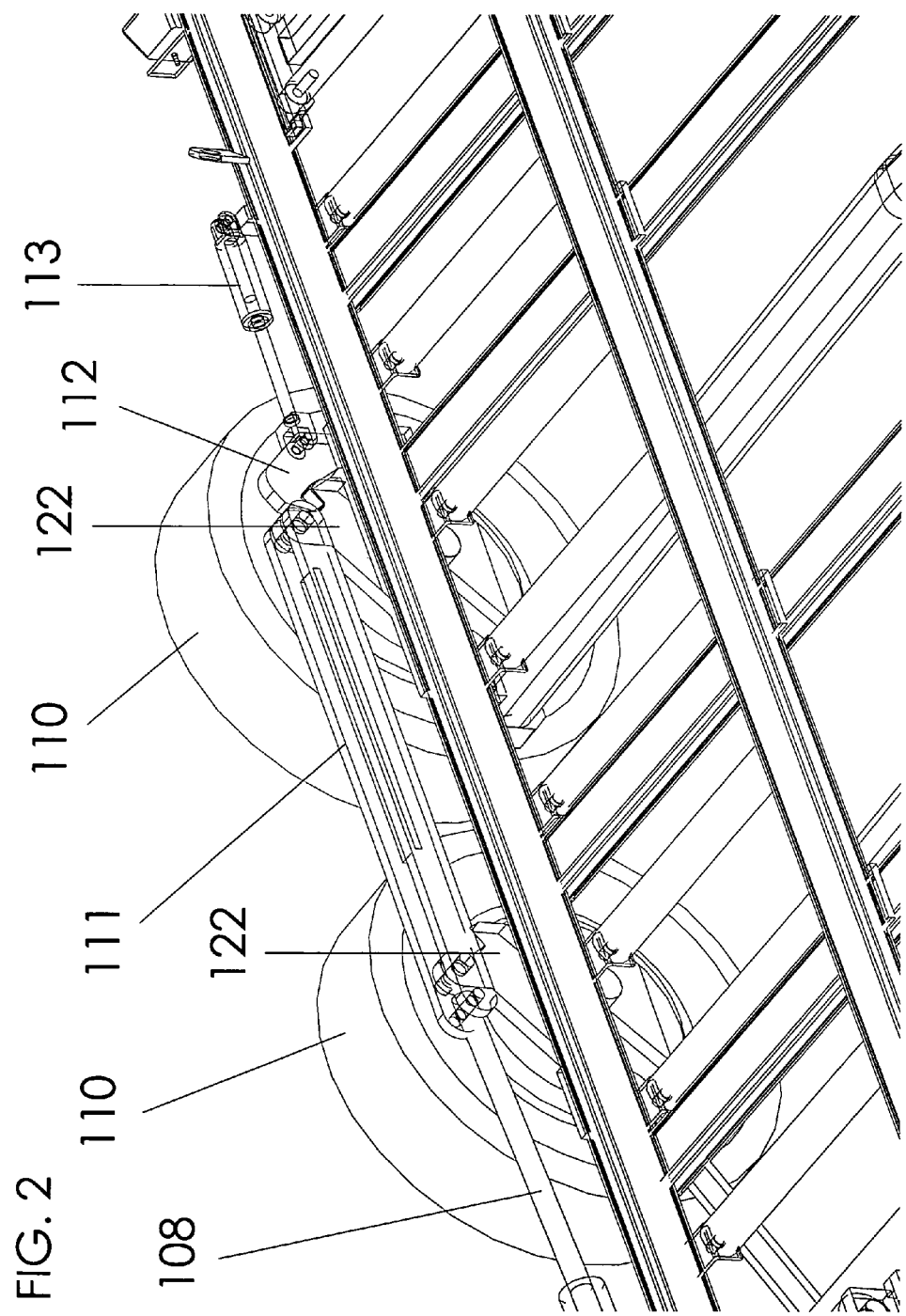
FIG. 2 is an inboard view of wheels of the helicopter transport apparatus locked in place for the proper elevation of the apparatus for transporting a helicopter.
Figure 3:
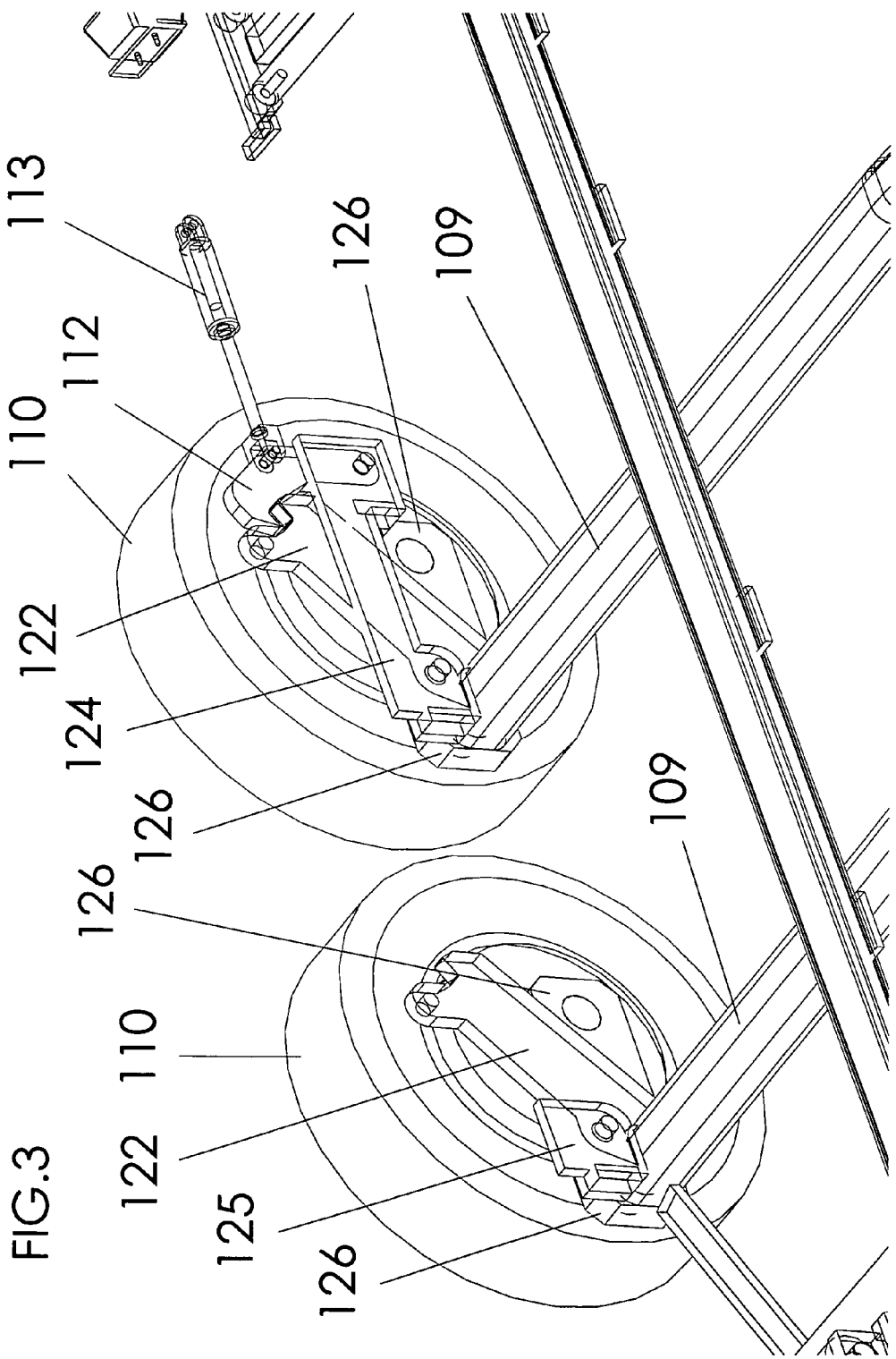
FIG. 3 is a closer view of details from FIG. 2.
Figure 4:
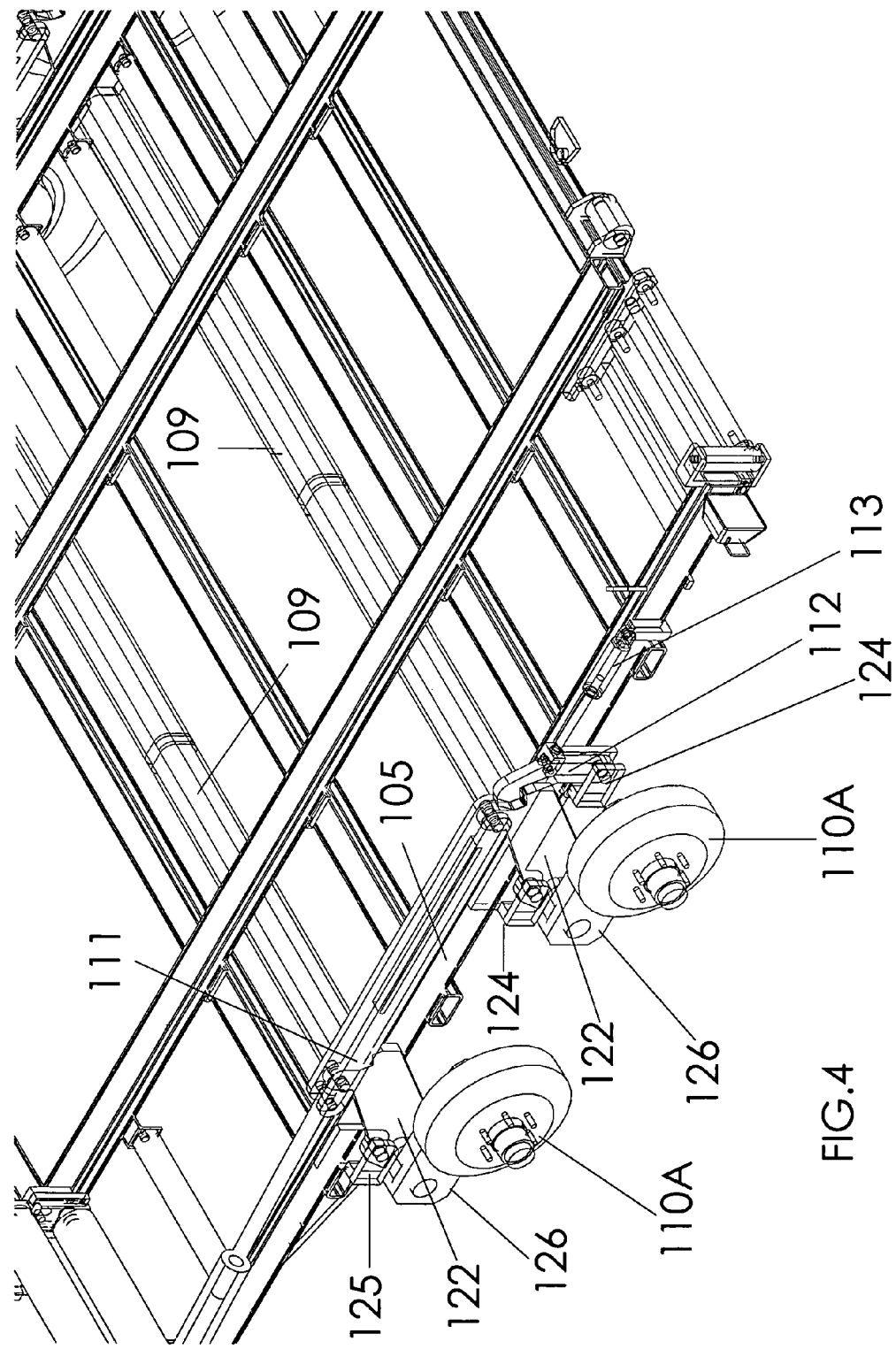
FIG. 4 is an outboard view of wheels locked in place at elevation for transporting a helicopter.
Figure 6:
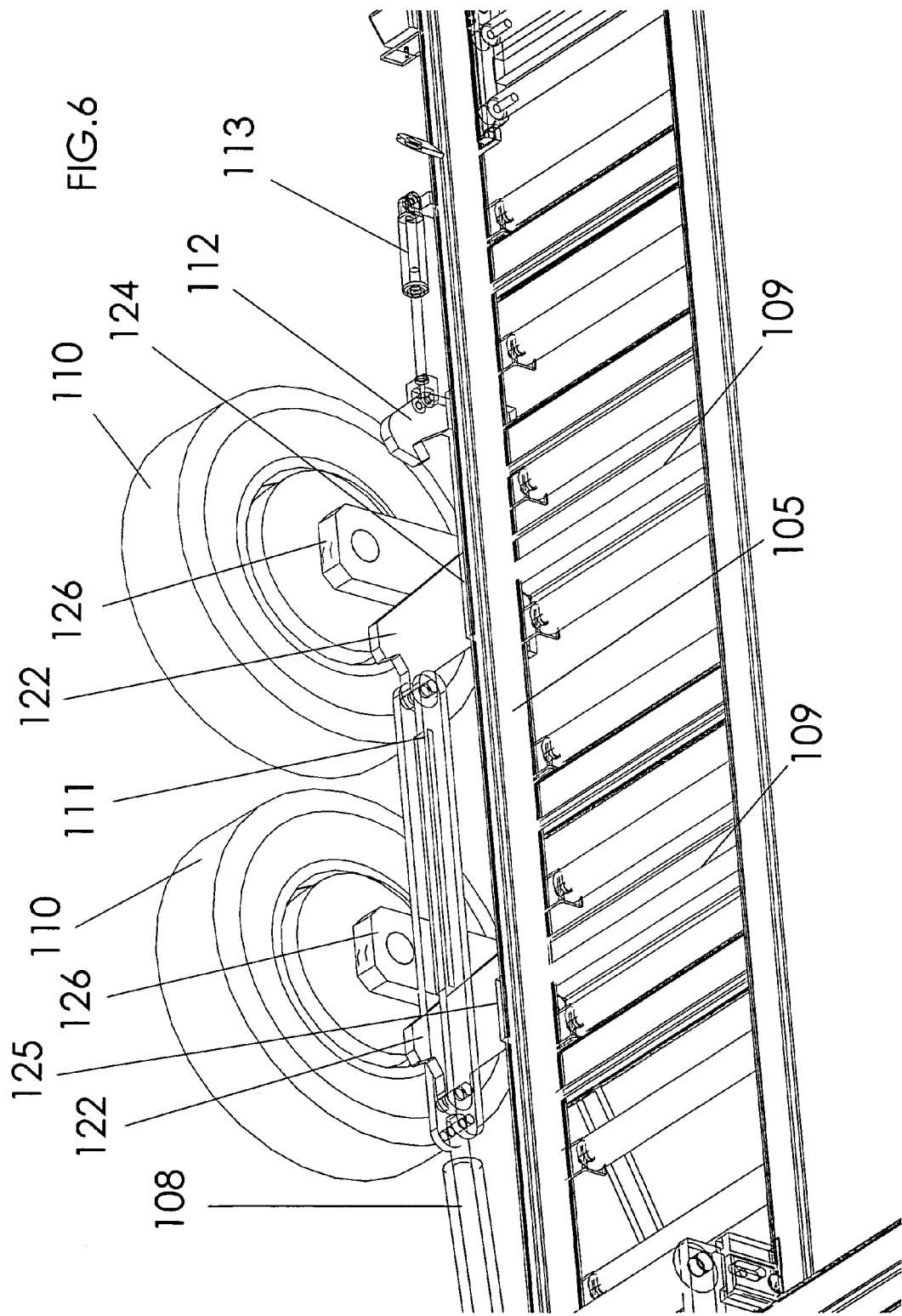
FIG. 6 illustrates wheels positioned for loading a helicopter.

Refer to FIG. 4 or an outside view and to FIGS. 2 and 3, for a view inside a pair of wheels 110 locked into position required for transporting a helicopter, and to FIGS. 5 and 6 for the wheels 110 unlocked for loading a helicopter, where one pivot link 111 connects to each of two axle pivots 122 as well as one of the lift cylinders 108 and also one of the lock cylinders 113 and also to two axle pivots 122.

Also shown, in FIG. 4 are a pair of the wheels/brakes/axle assemblies 110A with the wheels 110 (shown in FIGS. 1, 2, and 3) removed.

Referring also back to FIG. 1, as well as FIGS. 2, 3, and 4, 5, and 6, the axles 109 connect to links 126 which link to the wheels 110. Each axle 109 pivots a pair of axle pivots 122. Each pair of axle pivots 122 are pivotably connected to either of a rear axle pivot 124 or a front axle pivot 125, each pair of which said pivots, 124 or 125, is connected to the wheels 110 connected to a given axle 109. This arrangement causes the axle pivots 122 on each side of the trailer 10 to rotate at the same speed such that the platform 118 of the trailer is maintained in a level orientation as the trailer is raised and lowered.

The axle pivots 122, when unlocked by action of the lock cylinders 113, can be rotated in either direction, clockwise or counterclockwise by action of the lift cylinders 108 on the pivot links 111 which rotate the links 126 which raises or lowers the wheels 110, which in turn control the elevation of the helicopter transport apparatus 10 for loading, unloading, or transport.

The axles 109 are Henschen DURA-FLEX™ torsion axles known to the trade. Applicants could not find any application reference to use of Henschen DURA-FLEX™ torsion axles on transport trailers at the web site, www.henschenaxles.com, so believes this application is unique.

Figure 7:
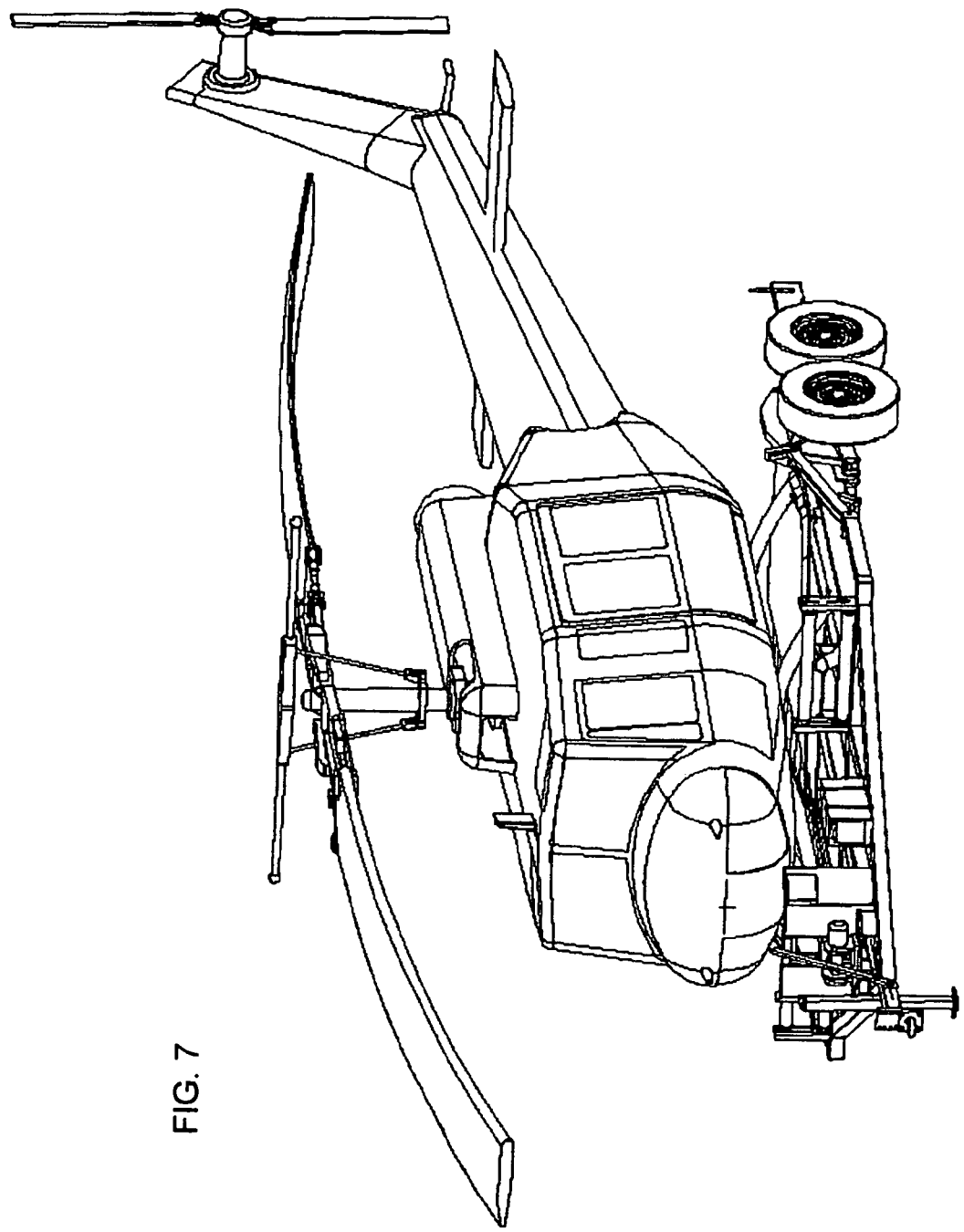
FIG. 7 illustrates an application of the helicopter transport apparatus.

FIG. 7 illustrates an application of an embodiment of the present invention.

In operation the trailer 10 is backed up such that the vertical rollers 115 are on either side of the helicopter skids and the trailer 10 is generally aligned with the helicopter. The cable (not shown) is released from the winch 121 and can be attached to the helicopter. Latch cylinder 113 can be powered to release the latches 112. Cylinder 108 can then be powered to move the pivot link 111 from the transport position shown in FIG. 2 to the loading position shown in FIG. 6. The pivot link 111 is then free to move. Power from battery box 120C can then be applied to power a hydraulic pump 106 to power winch 102 to wind the cable and drag the helicopter. The plate 118 and tops of horizontal rollers 109 form a horizontal platform surface. As the winch 121 tightens the cable the helicopter will move toward the trailer. The person loading the helicopter can use a remote control to control winch 121, this allows the operator to stand at a safe distance and walk around the helicopter as it loads. Vertical rollers 115 on the trailer corners help to guide the helicopter skids onto the trailer 10. The winch 102 pulls the helicopter forward toward the front of the trailer 10 until the skids contact bumpers 107.

The helicopter can then be secured to the trailer 10 and the cylinder 108 reverses direction moving the pivot link 111 back to pivot the axle pivots 122 to raise the trailer deck platform 118 and helicopter from the load position back to the transport position. When the platform 118 is fully raised the link 111 can be locked against motion by cylinder 113 controlled latch 112. The remote control can control operation of just the winch 121 or of the winch 121 and cylinders 108, 113.

As shown the winch 121, latch cylinders 113 and ram cylinders 108 are all powered by hydraulic fluid from pump 106 which in turn is powered by battery 120 C. It will be understood that the cylinders and/or winch could be electrically powered directly from the battery 120C.

Although the description above contains many specificities, these should not be construed as limiting the scope of the invention but as merely providing illustrations of some of the presently preferred embodiments of this invention.

It will be obvious to those skilled in the art that modifications may be made to the embodiments described above without departing from the scope of the present invention.

Thus the scope of the invention should be determined by the appended claims in the formal applications and their legal equivalents, rather than by the examples given.

HyVee HATTrailer

Why Choose the HATTrailer to Move or Recover Skid Aircraft?

The HyVee HATTrailer Saves Flight Hours by eliminating the need for aerial recovery of downed aircraft where the situation permits ground recovery.

The HyVee HATTrailer Trims Manpower requirements because the trailer is designed where one person, with virtually any type of tow vehicle capable of the load, can physically recover downed aircraft.

The HyVee HATTrailer Enhances Safety by reducing the man work required for recovery.

The HyVee HATTrailer Reduces Risk by eliminating the need to rig and lift aircraft by crane or helicopter.

The HyVee HATTrailer Decreases Vehicle Requirements by eliminating the need for cranes, lowboy trailers, or flat bed transport trucks.

HyVee HATTrailers will accomplish all these objectives where it has been assessed that a helicopter can be safely moved by ground transport, whether for simple administrative or maintenance moves across the airfield, or in off-site recovery where terrain and mission permit ground recovery.

HATTrailer movement and recovery of skid helicopters can be especially advantageous in Saving allocated Flight Hours or Flight Hour Costs of the aircraft to be moved, or by eliminating aerial recovery in situations where aerial movement can be replaced by cost and mission effective ground transport. Approximate flight hour costs can be as much as: OH 58—$1,600.00/hour; UH I—$1,600; UH 60—$2,600/hour; CH 47—$2,700/hour.

HATTrailers can Trim Manpower requirements. One person can prepare a helicopter for movement, load and tow a helicopter where safety requirements allow. The hydraulic trailer bed and the loading winch can be operated remotely from a stand off position where the operator can watch the entire length of the aircraft throughout the loading process.

HATTrailers Enhance Safety by reducing manpower handling requirements of the aircraft for recovery, whether replacing specialized skid wheels or specialized lift equipment, rigging and handling. In most skid aircraft recovery operations the aircraft must be prepared for sling loading using specialized sting loading procedures, equipment and rigging personnel even when it is to be loaded onto conventional ground transport due to crane lift requirements. Specialized sling loading procedures, equipment and personnel must be utilized in aerial recovery operations.

HATTrailers Reduce Risk by eliminating many aerial recovery operations where risk assessment must take into account all aspects of aerial movement to the recovery site, over flight of possible built up sites and in hook up and unhooking procedures. Additionally HATTrailer movement can reduce the risk of noise complaint processing costs which can be as much as $1,500.00 per incident even if there is no over flight damage due to personal investigative and administrative costs.

HATTrailers used in skid aircraft recovery and movement operations Reduce Ground Vehicle Requirements. Standard ground recovery requires the use of specialized cranes to lift, after specialized rigging using specially trained personnel, the skid aircraft on to a transport platform. Heavy lift ground recovery vehicles are then saved for other missions. In addition, the HATTrailer has a self-contained electrical and hydraulic system eliminating the need for tow vehicle power hook-up to the HATTrailer.

The HATTrailer bottom line is that it saves money, time and equipment while enhancing safety and reducing risk.

The invention claimed is:

1. An aircraft transport trailer for loading, transporting, and unloading a helicopter comprising;
a multi-wheel trailer;
a height adjustable roller platform, a hydraulic power unit, hydraulic lift cylinders, a winch, wherein the hydraulic lift cylinders can adjust the platform height from a first transport position to a second load position wherein the height adjustable roller platform includes a plurality of horizontal rollers such that the rollers form a horizontal roller surface that a load will roll on as pulled by said winch.

2. The trailer of claim 1 wherein the winch includes a remote control and can pull a load onto the platform.

3. The trailer of claim 2 including vertical guide rollers to guide a load onto said height adjustable roller platform and rocker rollers at an edge of the platform.

4. The trailer of claim 1 wherein said platform is supported by at least one rotatable pivot member on each side of the platform and rotation of the pivot members by said lift cylinders moves the platform from said first to said second position.

5. The trailer of claim 4 including a hydraulically actuated mechanical lock to lock said rotatable pivot member in said first position for transport of said trailer.

6. The trailer of claim 1 wherein said platform is supported by two rotatable pivot members on each side of said platform, said pivot members on each side are connected by a link to said lift cylinder such that linear motion of said lift cylinder causes rotation of both pivot members to raise said platform from said second position to said first position and wherein the two rotatable pivot members on one side of said platform are connected to the two rotatable pivot members on the other side of said platform by axles such that the pivots on each side of said platform rotate together to maintain said platform level as it raises and lowers.

7. A multi-wheel transport trailer comprising;
 a height adjustable roller platform having a first position for transporting a load and a second position for loading said load;
 a winch for moving said load mounted on said platform for movement therewith;
 a power unit mounted on said trailer;
 lift cylinders powered by said power unit for moving said platform from said first to said second position wherein the height adjustable roller platform includes a plurality of horizontal rollers such that the rollers form a horizontal roller surface that a load will roll on as pulled by said winch.

8. The trailer of claim 7 including vertical guide rollers to guide a load onto said platform and bumpers to position a load in a loaded position and rocker rollers at an edge of the platform.

9. The trailer of claim 7 wherein said power unit includes a battery and a hydraulic pump powered by said battery and wherein said winch is controlled by a remote control.

10. The trailer of claim 7 wherein said platform is supported by two rotatable pivot members on each side of said platform, said pivot members are connected by a link to a ram such that linear motion of said ram causes rotation of both pivot members to raise said platform from said second position to said first position.

11. The trailer of claim 10 including a hydraulically actuated mechanical lock to lock said rotatable pivot member in said first position for transport of said trailer.

12. A multi-wheel transport trailer comprising;
 a height adjustable roller platform having a first position for transporting a load and a second position for loading said load;
 a winch for moving said load mounted on said platform for movement therewith;
 a power unit mounted on said trailer;
 wherein said platform is supported by two rotatable pivot members on each side of said platform, wherein each pivot member is supported from an axle of a wheel, said pivot members are connected by a link to a lift cylinder such that linear motion of said lift cylinder causes rotation of both pivot members to raise said platform from said second position to said first position wherein the height adjustable roller platform includes a plurality of horizontal rollers such that the rollers form a horizontal roller surface that a load will roll on as pulled by said winch.

13. The trailer of claim 12 including a hydraulically actuated mechanical lock to lock said rotatable pivot member in said first position for transport of said trailer and rocker rollers at an edge of the platform.

14. The trailer of claim 13 wherein said power unit includes a battery and a hydraulic pump powered by said battery and wherein said hydraulic pump powers a ram and said battery powers said winch.

15. The trailer of claim 14 wherein the winch and rams are controlled by a remote control.

16. The trailer of claim 15 wherein a rotatable pivot on one side of said platform is connected to a rotatable pivot on the other side of said platform by an axle.

\* \* \* \* \*